N. BALDWIN.
POWER PRESS FEED.
APPLICATION FILED OCT. 1, 1919.
1,358,609.
Patented Nov. 9, 1920.
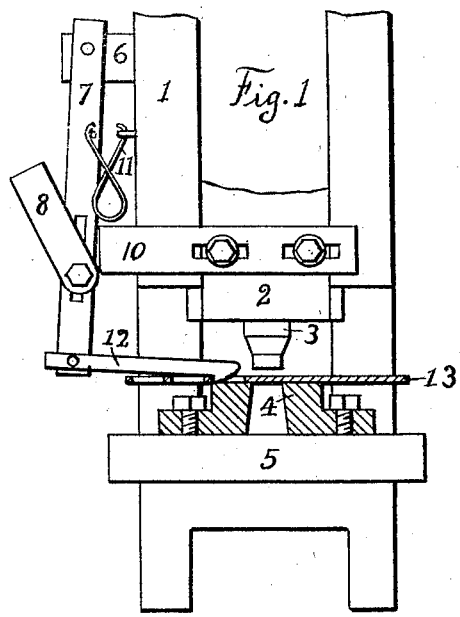
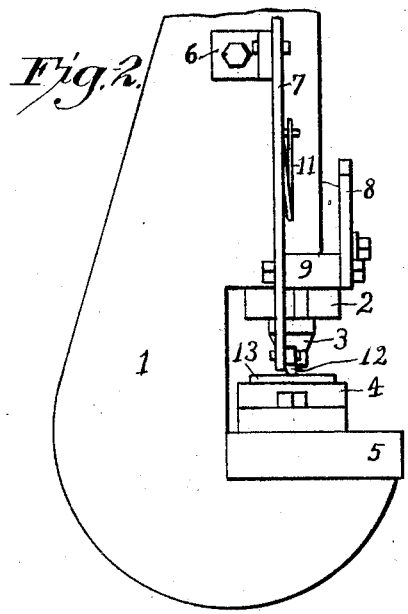
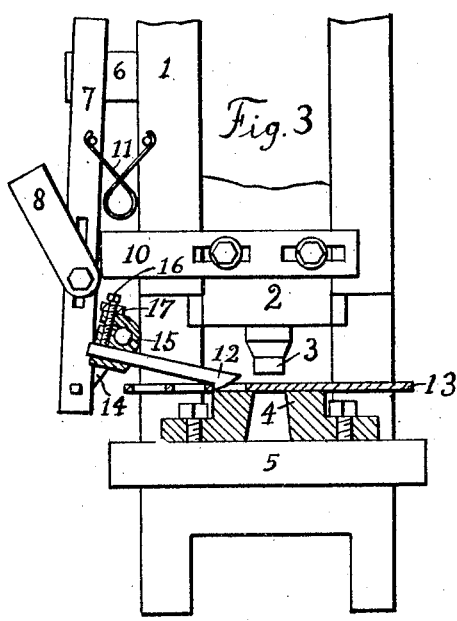
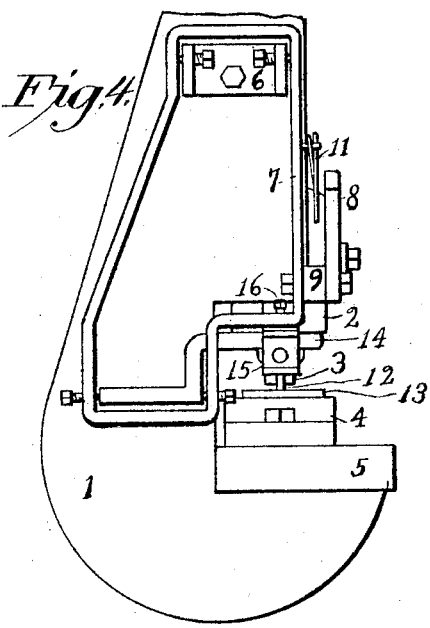
Nathaniel Baldwin
Inventor

UNITED STATES PATENT OFFICE.

NATHANIEL BALDWIN, OF EAST MILL CREEK, UTAH.

POWER-PRESS FEED.

1,358,609.     Specification of Letters Patent.     Patented Nov. 9, 1920.

Application filed October 1, 1919. Serial No. 327,761.

*To all whom it may concern:*

Be it known that I, NATHANIEL BALDWIN, a citizen of the United States, and a resident of East Mill Creek, in the county of Salt Lake and the State of Utah, have invented new and useful Improvements in Power-Press Feeds, of which the following is a specification.

My invention consists of a number of parts or attachments to be applied to a power press and the object is to provide a simple, convenient, and efficient automatic feed which is adjustable and adaptable to nearly all kinds of press work.

I attain this object by the mechanism illustrated in the accompanying drawing in which Figure 1 is a front elevation of a portion of a power press with certain parts in section and the essential parts of the feeder attached. Fig. 2 is a side elevation of the same combination as shown in Fig. 1. Fig. 3 is a front elevation showing parts in section of a power press with a modification of the feeding mechanism in which greater adjustment and adaptability is obtained. Fig. 4 is a side elevation of the mechanism shown in Fig. 3.

In the several figures of the drawing numeral 1 designates the main frame of the press in which slides the ram 2. The ram 2 carries the upper die 3. The lower die 4 is bolted to the table 5.

The feeding mechanism consists of a bracket 6 secured to the frame 1, an oscillating lever 7 pivoted to the bracket 6, an adjustable inclined sliding contact part 8 bolted to the spacing block 9 which is bolted to the lever 7, an adjustable sliding contact part 10 which is bolted to the ram and bears against the inclined surface of the sliding contact part 8, a spring 11 connected to pegs set in the lever 7 and frame 1, and a dog 12 which is pivoted to the lever 7 and adapted to move the sheet or material 13 which is being fed into the machine. The dog 12 is adapted to take hold of the narrow portion of material left between punchings and move the material forward.

In Figs. 3 and 4 the mechanism is modified and the lever 7 takes the form of a frame which is connected to the bracket 6 by two pivots, and the dog 12 is adjustably secured to a rod 14 which is bent twice at right angles and connected to the lever 7 by two pivots as illustrated. The dog 12 is connected to the rod 14 by means of a holder 15 shown in section in Fig. 3. The dog 12 is set in the holder by means of the set screw 16 and the holder is clamped tight upon the rod 14 by the nut 17. The object of this arrangement of the dog 12 is that in punching a wide sheet with several rows of punchings, the dog may be moved along the rod 14 and set so that it will work in the same row of holes each time and insure the same spacing with the several rows. In this way the punchings may be made in the desired space relations and an economy of material effected.

These attachments are adjusted and operated as follows: Having the parts properly adjusted, the spring 11 keeps the inclined sliding contact part 8 in contact with the sliding contact part 10, and as the ram moves up and down, the lever 7 will execute a horizontal movement and the dog will do the feeding after the first hole is punched.

The spacing block 9 is adjusted vertically in the slot of the lever 7 so that the lower corner of the sliding contact part 10 will pass the inclined surface of the sliding contact part 8 before the upper die strikes the material, otherwise the dog would continue to pull while the dies are cutting. The stroke of the dog depends upon the inclination of the sliding contact part 8 which can be set at any angle desired. The sliding contact part 10 can be moved horizontally to the desired position and set and this assists in the adjustment of the mechanism. While the sliding contact part 10, may preferably be connected to the ram, it will be understood that it may be connected to the moving die, connecting rod, or other reciprocating member of the power press. It will be seen that the mechanism is simple, effective and easy to adjust and operate.

Having described my invention, I claim:

1. A power press feeding mechanism comprising means to engage the material to be fed, a lever to actuate said means and provided with a sliding contact part adjustably attached to said lever, a reciprocating member of the power press, a sliding contact part attached to said reciprocating member of the power press and engaging the sliding contact part attached to said lever.

2. A power press feeding mechanism comprising means to engage the material to be fed, a lever to actuate said means, a sliding contact part attached to said lever, a reciprocating member of the power press, a sliding contact part attached to said reciprocating member of the power press and engaging the sliding contact part attached to said lever, the surface of contact between the said sliding contact parts being oblique to the direction of motion of the said reciprocating member of the power press, and means to adjust the obliquity of said surface of contact.

3. A power press feeding mechanism comprising a dog to engage the material to be fed, a lever to actuate said dog and provided with a sliding contact part adjustably attached to said lever, a reciprocating member of the power press, a sliding contact part attached to said reciprocating member of the power press and engaging the sliding contact part attached to said lever.

4. A power press feeding mechanism comprising a dog to engage the material to be fed, a lever to actuate said dog, a sliding contact part attached to said lever, a reciprocating member of the power press, a sliding contact part attached to said reciprocating member of the power press and engaging the sliding contact part attached to said lever, the surface of contact between the said sliding contact parts being oblique to the direction of motion of the said reciprocating member of the power press, and means to adjust the obliquity of said surface of contact.

5. A power press feeding mechanism comprising means to engage the material to be fed, a lever to actuate said means, a contact part attached to said lever, a reciprocating member of the power press, a contact part attached to said reciprocating member of the power press and engaging the contact part attached to said lever, the surface of contact between the said contact parts being oblique to the direction of motion of the said reciprocating member of the power press, and means to adjust the obliquity of said surface of contact.

NATHANIEL BALDWIN.